United States Patent
Kiani

(10) Patent No.: US 6,520,686 B1
(45) Date of Patent: Feb. 18, 2003

(54) METHODS AND APPARATUS FOR FORMING A FIBER OPTIC CONNECTION

(75) Inventor: Sepehr Kiani, Watertown, MA (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/711,333

(22) Filed: Nov. 9, 2000

(51) Int. Cl.[7] .............................................. G02B 6/40
(52) U.S. Cl. ...................... 385/54; 439/289; 439/378
(58) Field of Search ............................... 385/54, 59, 70, 385/71, 76; 439/289, 378

(56) References Cited

U.S. PATENT DOCUMENTS

| | | | |
|---|---|---|---|
| 4,158,476 A | 6/1979 | McCartney | 350/96.21 |
| 4,258,977 A | 3/1981 | Lukas et al. | 350/96.21 |
| 4,613,105 A | 9/1986 | Genequand et al. | 248/178 |
| 5,082,344 A | 1/1992 | Mulholland et al. | 385/60 |
| 5,123,073 A | 6/1992 | Pimpinella | 385/59 |
| 5,257,332 A | 10/1993 | Pimpinella | 385/59 |
| 5,598,494 A | 1/1997 | Behrmann et al. | 385/59 |
| 5,778,123 A | 7/1998 | Hagan et al. | 385/76 |
| 5,838,856 A | * 11/1998 | Lee | 385/54 |
| 5,845,028 A | 12/1998 | Smith et al. | 385/59 |
| 5,920,670 A | 7/1999 | Lee et al. | 385/78 |

OTHER PUBLICATIONS http://www.furukawa.co.jp/connector/mtfer.htm, (No title), Furukawa Electric Co. Ltd., Chiyoda–ku, Tokyo, Japan, Oct. 30, 2000.

International Search Report from International Application No. PCT/US 01/46817, filed Aug. 11, 2001, 5 pages.

* cited by examiner

*Primary Examiner*—Javaid Nasri
(74) *Attorney, Agent, or Firm*—Chapin & Huang, L.L.C.; David E. Huang, Esq.

(57) ABSTRACT

The invention is directed to techniques for forming a fiber optic connection between a first connection assembly that provides alignment members and a second connection assembly that provides grooves such that a central axis of each groove of the second connection assembly is substantially perpendicular with a central axis of a corresponding alignment member of the first connection assembly. Each alignment member/groove pair can be positioned and oriented to control positioning of the first and second connection assemblies relative to each other in a single direction but allow movement in other directions to prevent physical stressing of the connection assemblies. That is, the alignment members of the first connection assembly can be arranged around a periphery of a first array of fiber ends of a first fiber optic cable, and the grooves of the second connection assembly can be arranged around a periphery of a second array of fiber ends of a second fiber optic cable such that the aggregate contribution of each alignment member/groove pair forms a self-aligning mechanism that properly aligns the first and second arrays of fiber ends to provide effective light transfer between fiber optic cables.

21 Claims, 8 Drawing Sheets

METHODS AND APPARATUS FOR FORMING A FIBER OPTIC CONNECTION

BACKGROUND OF THE INVENTION

A typical fiber optic cable includes a fiber for carrying light from one end to the other. In general, the fiber includes a core, a surrounding cladding and an outer jacket. Typically, the core is translucent material (e.g., glass, plastic, etc.) through which pulses of light (i.e., representing binary data) can propagate. The surrounding cladding includes material similar to that of the core but provides a lower refractive index than that of the core in order to cause properly angled light within the core to reflect back into the core with minimal light energy loss. The outer jacket (or buffer) protects and strengthens the cable.

A fiber optic connector typically resides at each end of the fiber optic cable. Such a connector typically includes a precision molded component called a ferrule (e.g., an MT ferrule). The ferrule, which is typically made out of metal, ceramic, plastic, or a combination of ceramic and plastic, holds the end of the fiber (i.e., the end of the fiber core and cladding) using epoxy or solder. The connector precisely positions the fiber end relative to another fiber optic component (e.g., a laser which outputs pulses of light, a sensor for receiving pulses of light, an end of a fiber belonging to another fiber optic cable, etc.) in order to minimize light energy loss.

Some fiber optic cables include multiple fibers (e.g., a bundle of fibers) which terminate at specialized connectors that position the ends of the fibers in a row (i.e., a row of fiber ends). A user can attach two of these cables together to form longer fiber optic pathways through the lengths of the two cables using a specialized coupling called an adaptor. The adaptor receives and holds the specialized connectors which terminate the ends of the cables.

One approach to aligning together two fiber optic connectors is called the pin-in-hole approach. Here, the user plugs the connector of a first cable into an adaptor, and then plugs the connector of a second cable into the adaptor such that the row of fiber ends of the first cable face a corresponding row of fiber ends of the second cable. A pair of metal pins residing on the ends of the row of fiber ends of the first cable extend outward in a direction parallel to the fibers. The metal pins are located and held in the ferrule. As the user plugs the cable of the second connector into the adaptor, this pair of metal pins inserts into corresponding holes residing on the ends of the row of fiber ends of the second cable to properly position the two connectors relative to each other. Once the fiber ends of the first cable are properly aligned with the fiber ends of the second cable, light from a fiber end of one cable can pass to a corresponding fiber end of the other cable with minimal light energy loss.

Fiber optic cables which have two, four, eight or 12 fibers typically terminate using connectors which configure the fiber ends into a single row configuration (e.g., a single row of two, four, eight or 12 fiber ends). A fiber optic cable having 24 fibers typically terminates in a double row configuration (e.g., two rows with each row having 12 fiber ends). In both the single row configuration and the double row configuration, a pair of metal pins, one at each end of the single or double row configuration, aligns the two connectors relative to each other.

SUMMARY OF THE INVENTION

Unfortunately, there are deficiencies to the above-described conventional pin-in-hole approach for connecting two fiber optic cables. For example, the conventional pin-in-hole approach relies on the placement of a pair of metal pins (one metal pin at each end of a single or double row configuration of fiber ends) to properly hold the fiber optic cable connectors in place relative to each other. As each metal pin inserts into its corresponding hole, any minor anomalies or subtle irregularities in the pins or connector bodies (e.g., a bent pin, an irregular pin hole, etc.) could result in a substantial stress on the connector bodies that either damages or distorts the connector bodies and prevents the fiber ends from aligning properly. In some cases, the stresses and distortions result in an air gap between the fiber ends which causes light energy loss between the fiber ends (e.g., due to lack of contact between corresponding fiber ends) and provides an area that can collect dirt. This is due, at least in part, to each metal pin having to restrain connector movement in multiple directions, e.g., along a direction perpendicular to the row of fiber ends (the X-direction), along a direction parallel to the row of fiber ends (the Y-direction), etc. This situation, which often involves the metal pins competing with each other, is typically referred to as an overconstrained situation.

Additionally, the metal pins typically concentrate connector stiffness and alignment near the center of the row configuration of fiber ends held within the connectors. As a result, the fiber ends at the center of the row configuration are typically aligned properly. However, the fiber ends toward the ends of the row configuration and near the metal pins, i.e., the metal pins furthest away from the center, can easily be misaligned and/or have air gaps therebetween. In some situations, such misalignment can cause a loss of light energy through the fiber optic pathways formed by the two connected cables (e.g., due to air gaps, collected dirt, lack of contact between fiber ends, etc.), or in extreme cases, complete loss of a light signal.

Furthermore, the sides of the ferrule having the exposed fiber ends are often polished to improve surface quality (e.g., to remove surface defects) to minimize light energy loss between fibers and such polishing, in some situations, tends to exacerbate the loss of light energy exchanged between some fiber ends. In particular, such polishing tends to leave the fiber ends near the center of the row at clean right angles (i.e., perpendicular) for optimal light exchange, but tends to taper the fiber ends toward the edges of the row such that the fiber ends near the ends of the row typically have non-perpendicular surfaces. If there is no compensation for the non-perpendicular surfaces of these fiber ends (e.g., pressure placed on the fiber ends to make them perpendicular, joining with other fiber ends having complementary non-perpendicular surfaces, etc.), air gaps (a source of high light energy loss) will form between the fiber ends resulting in lack of contact between corresponding fiber ends and less than optimal light transfer. As such, the amount of lost light energy tends to be greatest through the fiber ends near the ends of the fiber end row where tapering results in non-perpendicular fiber end surfaces.

In contrast to the above-described conventional pin-in-hole approach to connecting fiber optic cables, the invention is directed to techniques for forming a fiber optic connection through the application of kinematic coupling concepts to properly align corresponding fiber ends (e.g., a "perfectly constrained" situation). A thorough discussion of kinematic coupling concepts is found in a book entitled, "Precision Machine Design," by Alexander H. Slocum, Prentice-Hall, Englewood Cliffs, N.J., 1992.

The fiber optic connection forms between a first connection assembly that provides alignment members and a second connection assembly that provides grooves such that a central axis of each groove of the second connection assembly is substantially perpendicular with a central axis of a corresponding alignment member of the first connection assembly. Each alignment member/groove pair can be positioned and oriented to control positioning of the first and second connection assemblies relative to each other in a single direction while allowing movement in other directions to prevent physical stressing of the connection assemblies. That is, the alignment members of the first connection assembly can be arranged around a periphery of a first array of fiber ends of a first fiber optic cable, and the grooves of the second connection assembly can be arranged around a periphery of a second array of fiber ends of a second fiber optic cable such that the aggregate contribution of each alignment member/groove pair forms a self-aligning mechanism that properly aligns the first and second arrays of fiber ends and minimize creation of air gaps between corresponding fiber ends (i.e., lack of contact between fiber ends) to provide effective light transfer between fiber optic cables.

The invention is based in part on the observation that physical bodies (e.g., fiber optic connectors) have six degrees of freedom (lateral movement in the X, Y and Z directions as well as rotation movement around the X, Y and Z axes). Since each groove controls movement of a corresponding alignment member in a direction that is perpendicular to a central axis of the groove, but allows movement in other directions (e.g., a direction along the central axis), less stress is placed on the connectors bodies (i.e., the connector housings forming the alignment member and the grooves) relative to the stress placed on conventional pin-in-hole connection systems which attempt to control movement of two fiber optic cable connectors using two metal pins inserted into two corresponding holes. Accordingly, the grooves and corresponding alignment members of the invention provide improved kinematic alignment with less distortion and strain that would otherwise result in improper alignment of fiber ends.

One arrangement of the invention is directed to a connection system having a first connection assembly, a second connection assembly and a coupling assembly. The first connection assembly has a first fiber optic cable portion and a first connector fastened to an end of the first fiber optic cable portion. The first connector has a housing and alignment members that extend from the housing. The second connection assembly has a second fiber optic cable portion and a second connector fastened to an end of the second fiber optic cable portion. The second connector has a housing that defines grooves. The coupling assembly couples the first connector of the first connection assembly with the second connector of the second connection assembly such that (i) the end of the first fiber optic cable portion faces the end of the second fiber optic cable portion and (ii) a central axis of each groove defined by the housing of the second connector is substantially perpendicular with a central axis of a corresponding alignment member of the first connector. Accordingly, each alignment member/groove pair can control movement in one direction (i.e., a direction perpendicular to the central axis of the groove) but allow movement in other directions (e.g., along the central axis of the groove, toward/away from the groove, etc.) thus preventing unnecessary stress on the connectors that would otherwise cause the fiber optic cable portion to align improperly.

In one arrangement, the central axes of the grooves intersect at an intersection point. For example, the end of the second fiber optic cable portion can include an M×N array of fiber ends (M and N being positive integers greater than 1), and the intersection point can reside within the M×N array of fiber ends. This arrangement enables the stiffness of the second connector to be focused within the M×N array (e.g., a square array). Accordingly, when the alignment members of the first connector engage the grooves of the second connector, a corresponding M×N array of fiber ends of the first fiber cable will tend to properly align with the M×N array of the second connector.

In another arrangement, the housing of the second connector defines, for each groove, at least two planar surfaces such that the corresponding alignment member for that groove contacts the housing at two locations when the first connector of the first connection assembly couples with the second connector of the second connection assembly. Such contact at the two locations for each alignment member/groove pair enables repeatability, i.e., consistent placement of that alignment member within the corresponding groove each time the first and second connectors connect with each other so that the fiber ends of each cable align with each other in a consistent manner.

In one arrangement, the housing of the first connector includes a base portion and a floating portion that is movable relative to the base portion. In this arrangement, the floating portion defines the alignment members. In one arrangement, the first connection assembly further includes springs disposed between the base portion and the floating portion of the first connector, and the floating portion is rigidly attached to the end of the first fiber optic cable portion such that the end of the first fiber optic cable portion is movable relative to the base portion. In this arrangement, the springs provide a consistent and uniform force that pushes the floating portion of the first connector into position relative to the second connector. The grooves of the second connector guide the alignment members defined by the floating portion so that the end of the first fiber optic cable portion properly faces the end of the second fiber optic cable portion.

The features of the invention, as described above, may be employed in fiber optic connection systems, devices and methods as well as other fiber optic components such as those manufactured by Teradyne, Inc. of Boston, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for forming a fiber optic connection through the employment of kinematic coupling concepts. A fiber optic connection is formed between a first connection assembly that provides alignment members (e.g., three) and a second connection assembly that provides grooves (e.g., three) such that a central axis of each groove of the second connection assembly is substantially perpendicular with a central axis of a corresponding alignment member of the first connection assembly. Each alignment member/groove pair can be positioned and oriented to control positioning of the first and second connection assemblies relative to each other in a single direction but allow movement in other directions to prevent physical stressing of the connection assemblies. That is, the alignment members of the first connection assembly can be arranged around a periphery of a first array of fiber ends of a first fiber optic cable, and the grooves of the second connection assembly can be arranged around a periphery of a second array of fiber ends of a second fiber optic cable such that the aggregate contribution of each alignment member/groove pair forms a self-aligning mechanism that properly aligns the first and second arrays of fiber ends to provide effective light transfer between fiber optic cables. The techniques of the invention may be used in fiber optic connection systems, components and procedures such as those of Teradyne, Inc. of Boston, Mass.

Figure 1:
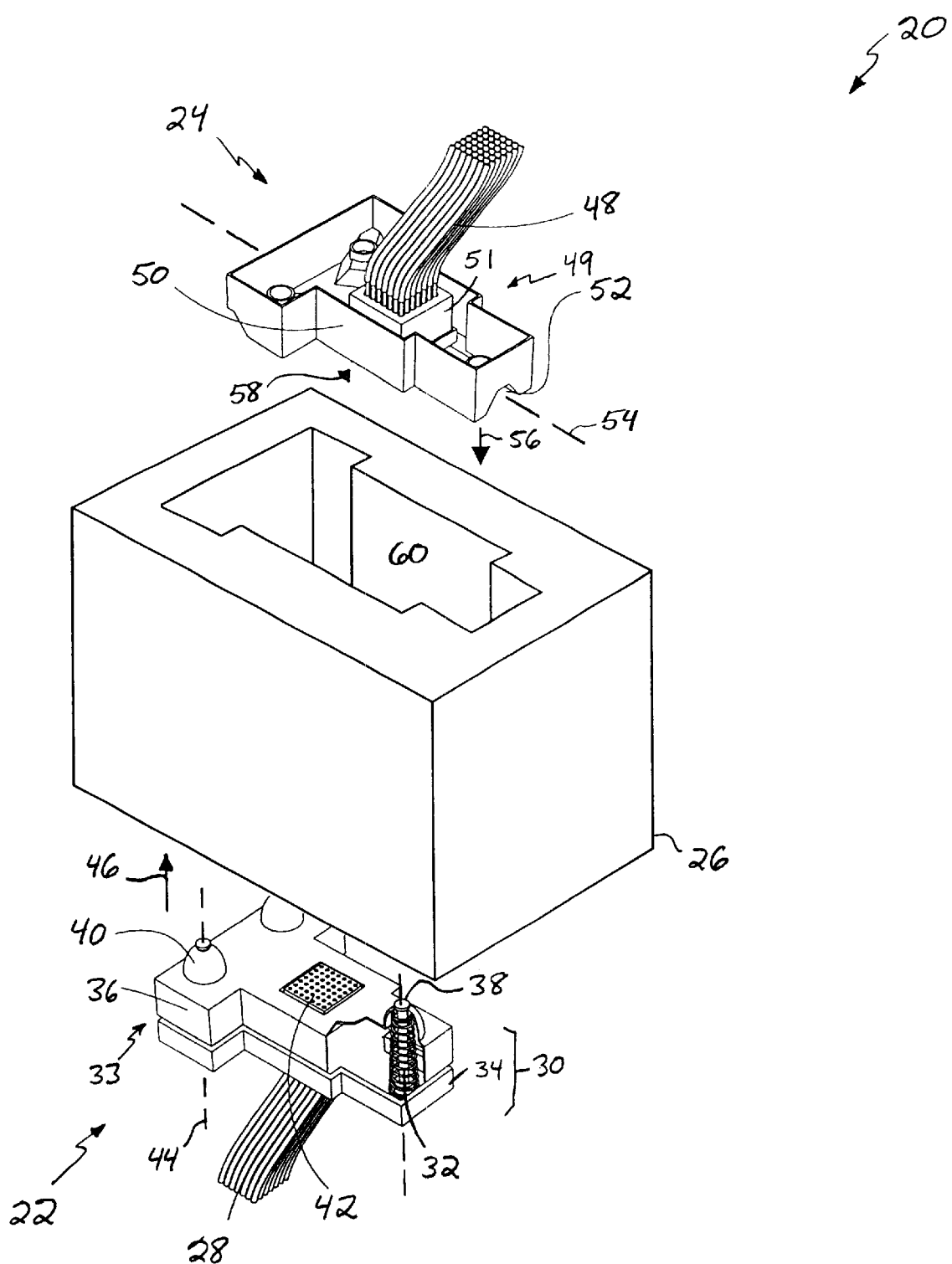
FIG. 1 is a perspective view of a cabled connection system which is suitable for use by the invention.

FIG. 1 shows a connection system 20 which is suitable for use by the invention. The connection system 20 includes a first connection assembly 22, a second connection assembly 24, and a coupling assembly 26 (e.g., an adaptor). The first connection assembly 22 and the second connection assembly 24 connect with each other within the coupling assembly 26, which holds the first connection assembly 22 and the second connection assembly 24 together once they are inserted (e.g., by a user) into the coupling assembly 26.

The first connection assembly 22 includes a fiber optic cable 28, a connector 30, and a set of springs 32 (see cut-away portion of the connector 30). The connector 30 includes housing 33 having a base portion 34 and a floating portion 36 which is suspended from the base portion 34 by the springs 32. The base portion 34 includes a set of posts 38 around which the springs 32 reside. The floating portion 36 of the housing 33 defines three ball-shaped alignment members 40. Each post 38 passes through a respective alignment member 40 and has an enlarged end that holds the floating portion 36 to the base portion 34 (i.e., that prevents the springs 32 from pushing the floating portion 36 completely off the base portion 34). An array of fiber ends 42 of the fiber optic cable 28 fastens to the floating portion 36 (e.g., epoxies to a precision ferrule which is mounted to the floating portion 36).

As shown in FIG. 1, the alignment members 40 have central axes 44 which run coaxially through the alignment members 40 and along the posts 38. The first connection assembly 22 inserts into the coupling assembly 26 when moved in a direction 46 along the central axes 44 toward the connection assembly 26.

The second connection assembly 24 includes a fiber optic cable 48 and a connector 49. The connector 49 includes a housing 50 and a ferrule 51 which holds fiber ends of the fiber optic cable 48 (e.g., using epoxy, solder, etc.). The housing 50 defines grooves 52 which correspond to the ball-shaped alignment members 40 of the first connection assembly 22. Each groove 52 has a central axis 54 which is perpendicular to the central axis 44 of a corresponding alignment member 40 such that, when that alignment member 40 engages that groove 52, the groove 52 restricts movement of the alignment member 40 in one direction (i.e., the groove 52 aligns the central axis 44 of that alignment member 40 on the central axis 54 of that groove 52) but permits movement in other directions. For example, the alignment member 40 can move along the central axis 54, rotate around the axis 54 and rotate around the axis 44. Other alignment member 40/groove 52 pairs similarly restrict movement in particular directions and allow movement in others such that the floating portion 36 of the first connection assembly 22 precisely locates relative to the second connection assembly 24 in a self-aligning manner.

As shown in FIG. 1, the second connection assembly 24 inserts into the coupling assembly 26 when moved in a direction 56 toward the adaptor 26 such that an array of fiber ends 58 of the second connection assembly 24 faces the array of fiber ends 42 of the first connection assembly 22. When both the first and second connection assemblies 22, 24 reside within the cavity 60 of the coupling assembly 26, the alignment members 40 engage the grooves 52 such that the array of fiber ends 58 precisely aligns with the array of fiber ends 42. The coupling assembly 26 holds (e.g., locks) the base portion 34 of the first connection assembly 22 and the second connection assembly 24 in place relative to each other. However, the floating portion 36 of the first connection assembly 24 remains movable relative the base portion 34 of the first connection assembly 22 and the second connection assembly 24. Further details of how the first connection assembly 22 connects with the second connection assembly 24 will now be provided with reference to FIGS. 2A, 2B and 2C.

Figure 2:
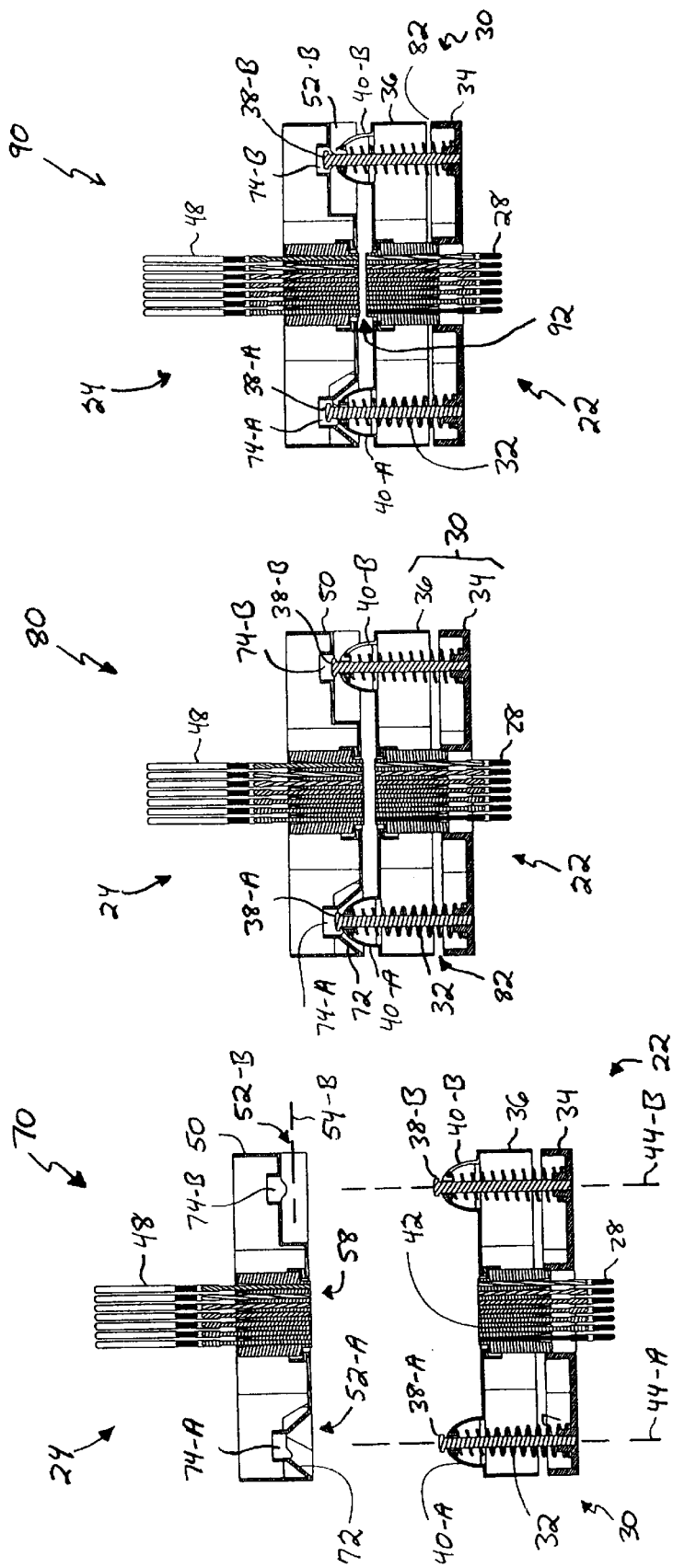
FIG. 2A is a cross-sectional side view of connection assemblies of the cabled connection system of FIG. 1 when the connection assemblies are disconnected from each other.
FIG. 2B is a cross-sectional side view of the connection assemblies of FIG. 2A when the connection assemblies are brought in contact with each other.
FIG. 2C is a cross-sectional side view of the connection assemblies of FIG. 2B when the connection assemblies are coupled with each other.

FIG. 2A shows a configuration 70 with the first connection assembly 22 and the second connection assembly 24 facing each other when brought together within the coupling assembly 26 (not shown in FIGS. 2A, 2B and 2C for simplicity). As the first connection assembly 22 and the second connection assembly 24 are brought together (e.g., by a user), the array of fiber ends 42 face the array of fiber ends 58 and the alignment members 40 (e.g., alignment members 40-A and 40-B in FIG. 2A) engage groove surfaces 72 of corresponding grooves 52 (e.g., grooves 52-A and 52-B in FIG. 2A). As shown, the central axis 44-B of the alignment member 40-B is perpendicular to the central axis 54-B of the groove 52-B.

FIG. 2B shows a configuration 80 with the first connection assembly 22 and the second connection assembly 24 when the alignment members 40 make contact with the groove surfaces 72. At this point, the ends of the posts 38 (e.g., posts 38-A and 38-B in FIG. 2B) loosely insert within cavities 74 defined by the housing 50 of the second connection assembly 24. Preferably, the posts 38 enter the cavities 74 but do not make contact with the housing 50 leaving movement of the first connection assembly 22 unrestricted by the posts 38. It should be understood that a clearance 82 between the base portion 34 and the floating portion 36 of the first connection assembly 22 is at its maximum due to maximum extension of the springs 32 while the ends of the posts 38 retain the floating portion 36 relative to the base portion 34.

FIG. 2C shows a configuration 90 with the first connection assembly 22 and the second connection assembly 24 when the first connection assembly 22 and the second connection assembly 24 are fully inserted into the cavity 60 of the coupling assembly 26 (also see FIG. 1). Preferably, the ends of the posts 38 within the cavities 74 still do not make contact with the housing 50 leaving movement of the first connection assembly 22 unrestricted by the posts 38. At this point, the base portion of the first connection assembly housing 30 is fixed relative to the second connection assembly housing 50. Additionally, the clearance 82 between the base portion 34 and the floating portion 36 is smaller due to the compression of the springs 82. As a result, the springs 32 of the first connection assembly 22 push the floating portion 36 of the housing 30 against the second connection assembly housing 50 with a controlled force such that the alignment members 40 are fully seated within the grooves 52.

In the configuration 90, the array of fiber ends 42 are precisely aligned with the array of fiber ends 58. Preferably, the corresponding fiber ends of the arrays 42, 58 are flush with each other (e.g., in healthy or robust physical contact) so that there is no air gap 92 in order to minimize light energy loss. However, in another arrangement, a small air gap 92 resides between the arrays 42, 58. In another arrangement, the arrays 42, 58 contact each other. In yet another arrangement, the gap 92 is filled with a gel (e.g., a light index matching gel) which assists in transferring light pulses between fiber ends of the two arrays with minimal light energy loss. Further details of how the connection system 20 achieves precise alignment will now be provided with reference to FIGS. 3, 4A, 4B and 4C.

Figure 3:
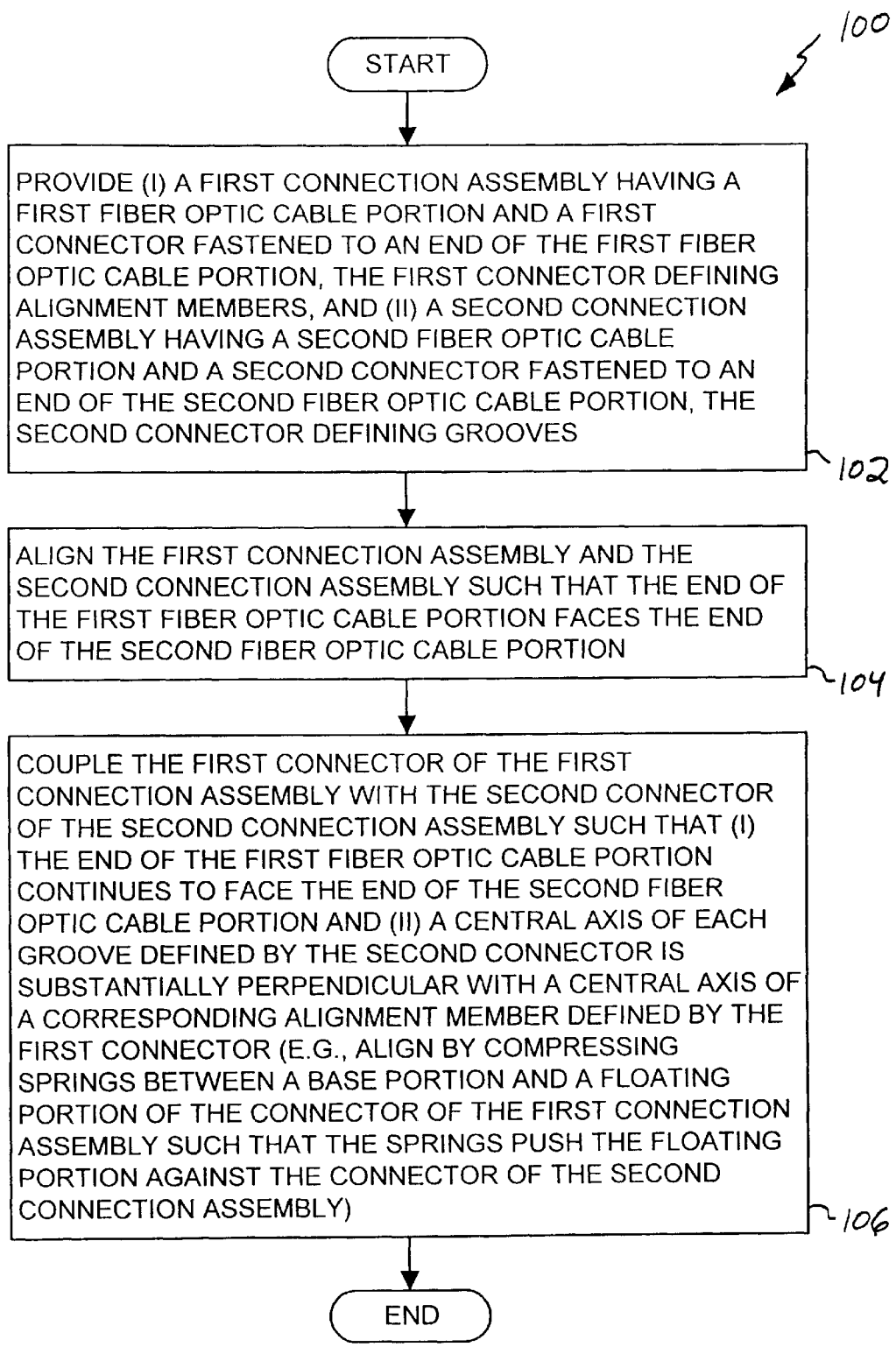
FIG. 3 is a flow chart of a procedure for connecting two connection assemblies which is suitable for use by the invention.
Figure 4A:
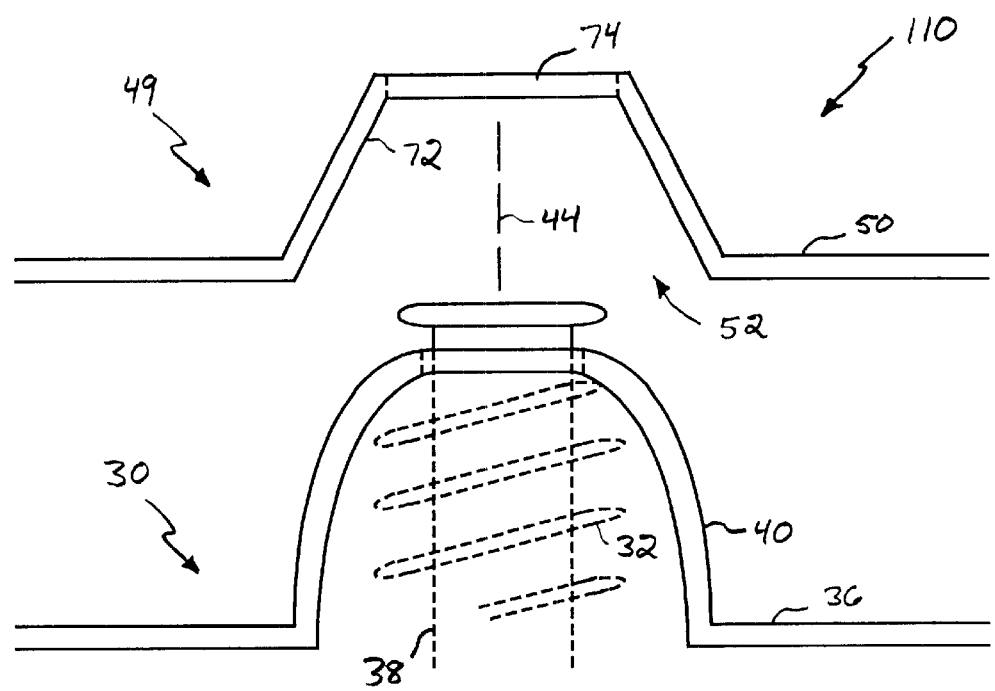
FIG. 4A is a cross-sectional side view of an alignment member of a first connection assembly and a groove of a second connection assembly when the first and second connection assemblies are disconnected from each other.

FIG. 3 shows a flow chart of a procedure 100 which is performed by a user in order to connect the first and second connection assemblies 22, 24. In step 102, the user provides the first connection assembly 22 which has the first fiber optic cable portion 28 and the first connector 30 fastened to the first fiber optic cable portion 28. Additionally, the user provides the second connection assembly 24 which has a second fiber optic cable portion 48 and a second connector 49 fastened to the second fiber optic cable portion 48. As shown in FIG. 4A and as described earlier, the housing 33 of the first connector 30 defines each ball-shaped alignment member 40 and the housing 50 of the second connector 49 defines each corresponding groove 52.

In step 104, the user aligns the first connection assembly 22 with the second connection assembly 24 such that the end of the first fiber optic cable portion 28 faces the end of the second fiber optic cable portion 58. In particular, the user inserts the first and second connection assemblies 22, 24 into the coupling assembly 26 as shown in FIGS. 1, 2A and 2B.

In step 106, using the coupling assembly 26, the user rigidly positions the base portion 34 of the first connection assembly 22 and the second connection assembly 24. Due to the proximity of the base portion 34 of the first connection assembly 22 with the second connection assembly 24, the springs 32 push the floating portion 36 of the first connection assembly 22 against the second connection assembly 24 such that the end of the first fiber optic cable portion 28 continues to face (and preferably contact) the end of the second fiber optic cable portion 58, and such that a central axis 54 of each groove 52 defined by the second connector 49 is substantially perpendicular with a central axis 44 of a corresponding alignment member 40 defined by the first connector 29.

Figure 4B:
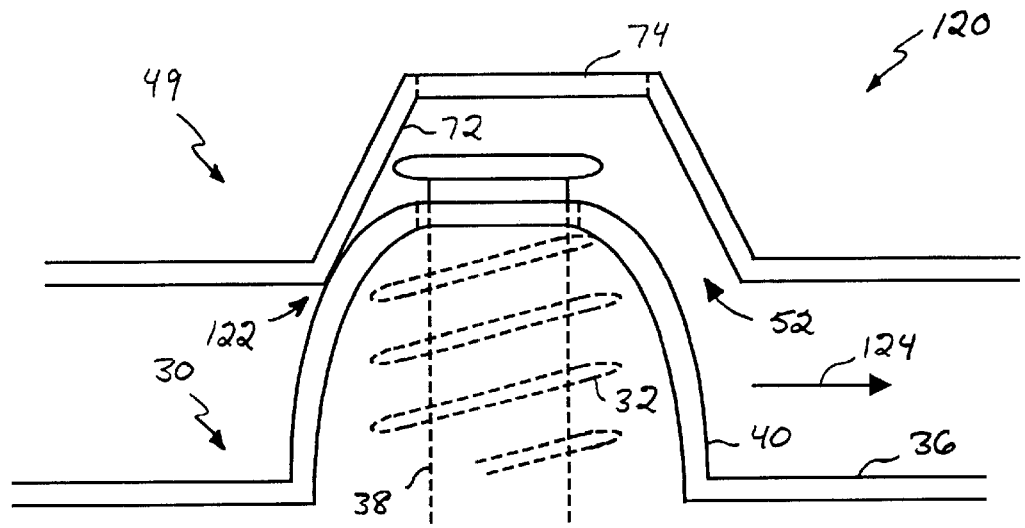
FIG. 4B is a cross-sectional side view of the alignment member of the first connection assembly and the groove of the second connection assembly of FIG. 4A when the first and second connection assemblies are brought in contact with each other.
Figure 4C:
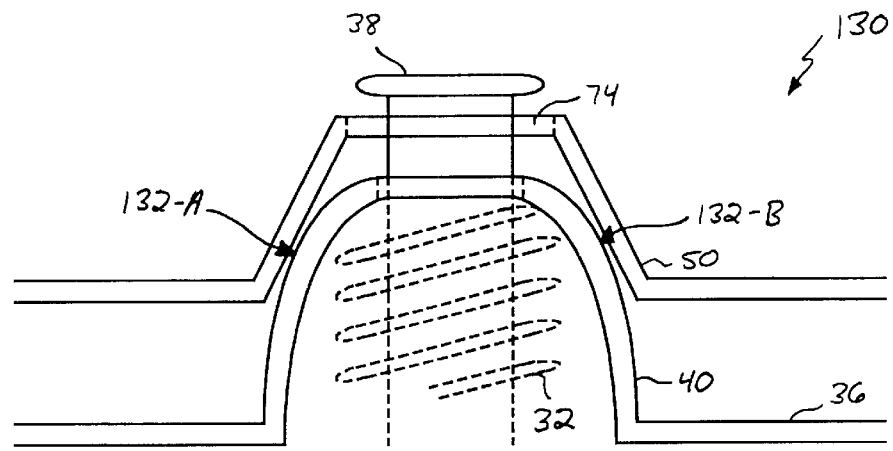
FIG. 4C is a cross-sectional side view of the alignment member of the first connection assembly and the groove of the second connection assembly of FIG. 4B when the first and second connection assemblies are coupled with each other.

As step 106 takes place, any misalignment between an alignment member 40 and a corresponding groove 52 automatically corrects due to the force of the springs 32 pushing the floating portion 36 of the first connection assembly 22 against the second connection assembly 24. In particular, as shown in FIG. 4B, contact 122 between the alignment member 40 and a single side 72 of the groove 52 results in movement of the alignment member 40 (and thus the entire floating portion 36) in a direction 124 toward the other side of the groove 52. As a result, as shown in FIG. 4C, the alignment member 40 fits within the groove 52 such that the alignment member 40 contacts the housing 50 of the second connection assembly 24 in two places 132-A, 132-B. Accordingly, the alignment member 40/groove 52 pair restricts movement of the floating portion 36 relative to the second connection assembly 24 along a single axis (see direction 124 of FIG. 4B) but allows the floating portion 36 to move along another axis, e.g., along the central axis of the groove 52 (out of the page in FIG. 4C). In a self-aligning manner, the floating portion 36 may move transversely and/or rotate until it orients properly to the second connection assembly 24 and with minimal stress.

Figure 5:
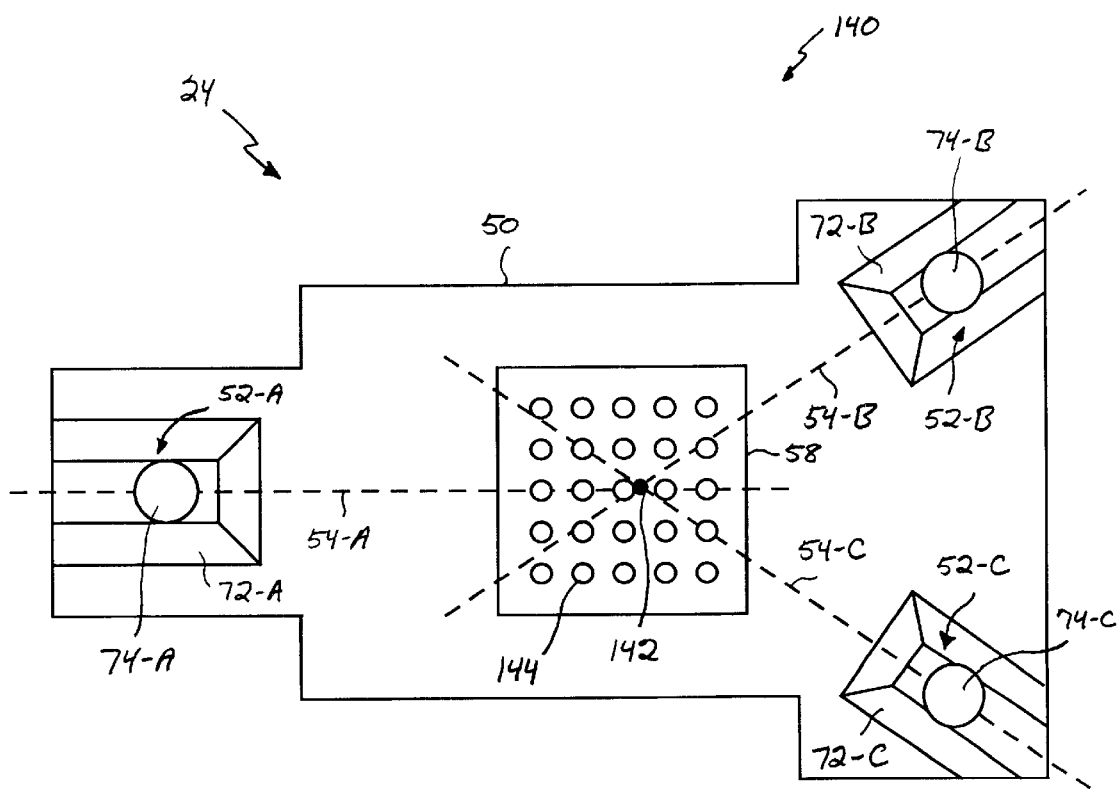
FIG. 5 is a top view of a connection assembly which is suitable for use by the invention.

FIG. 5 shows a top view 140 of the second connection assembly 24. The grooves 52 of the second connection assembly 24 are disposed around the array of fiber ends 58 at the periphery of the second connection assembly 24. The central axis 54 of each groove 52 is oriented in a different direction in order to control positioning of the floating portion 36 of the first connection assembly 22. Since the grooves 52 allow movement of the corresponding alignment members 40 along the central axes 54, there is less stress on the floating portion 36. Accordingly, there is little or no distortion in the floating portion 36 that would otherwise misalign the arrays of fiber ends 42, 58.

Preferably, the central axes 54 intersect at an intersection point 142 that lies within the array of fiber ends 58. Furthermore, the array of fiber ends 58 is preferably substantially square in shape (e.g., a 5×5 array, a 4×5 array, a 4×4 array, etc.). Accordingly, the center of stiffness of the housing 50 of the second connection assembly 24 lies close to each fiber end. As a result, there is better alignment of fiber ends with the connection system 20 vis-à-vis the conventional pin-in-hole approach which has a row configuration (e.g., a row of 12 fiber ends) that make alignment of the furthest fiber ends from the center of the row configuration difficult. Further details of the invention will now be provided with reference to FIG. 6.

Figure 6:
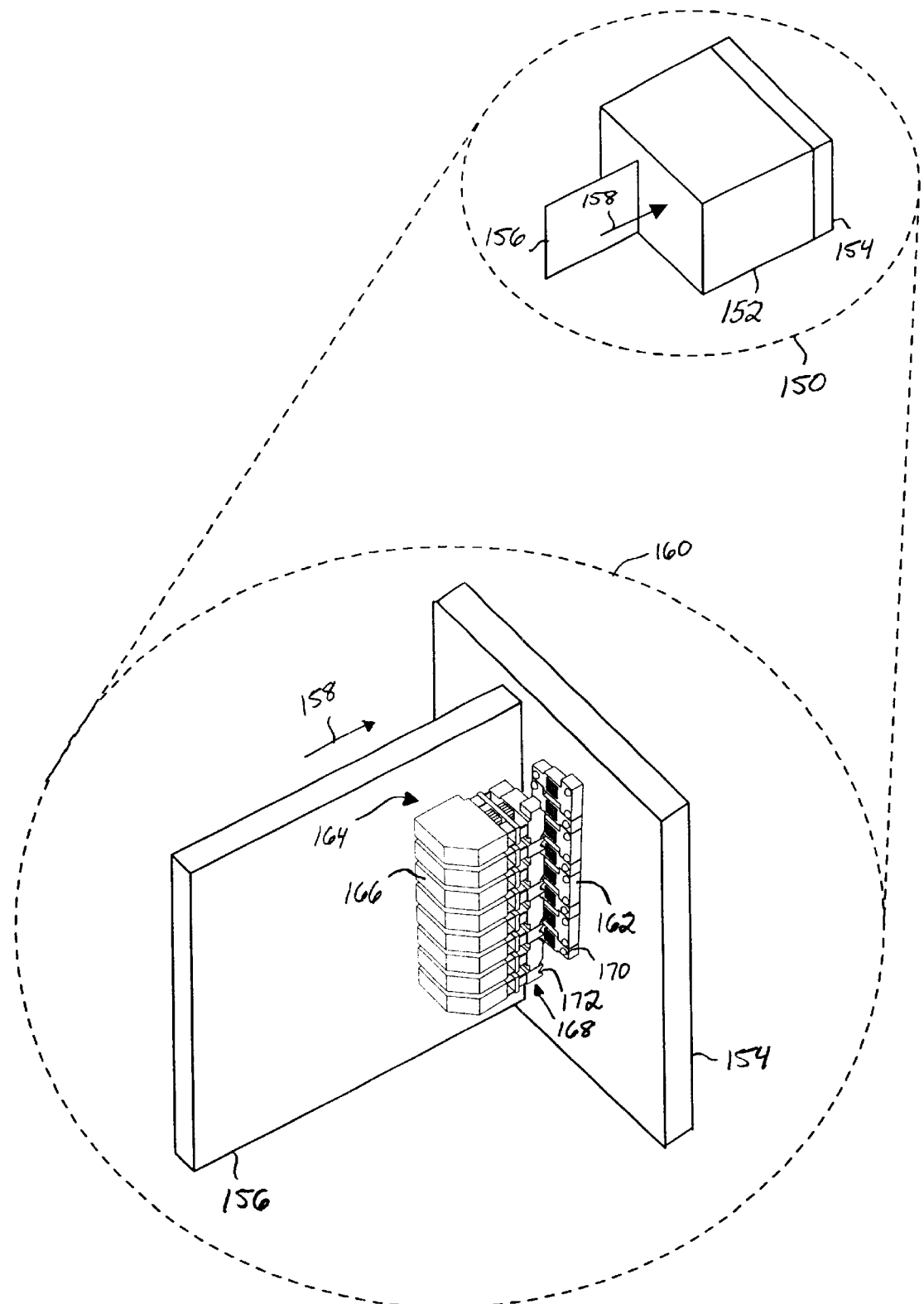
FIG. 6 is a perspective view of a circuit board connection system which is suitable for use by the invention.

FIG. 6 shows a circuit board/card cage connection system 150 which is suitable for use by the invention. The connection system 150 includes a card cage assembly 152, a backplane 154 and a circuit board 156. The circuit board 156 couples with the backplane 154 when installed in the card cage assembly 152 along a direction 158. The circuit board 156 and the backplane 154 communicate through a set of fiber optic components.

FIG. 6 further shows a more detailed view 160 of the circuit board 156 and the backplane 154 when they couple together within the card cage assembly 152. As shown, the backplane 154 includes a set of fiber optic connection assemblies 162. The circuit board 156 includes a complementary set of fiber optic connection assemblies 164. Each fiber optic connection assembly 164 includes (i) a transducer 166 that converts fiber optic signals into electrical signals and electrical signals into fiber optic signals. Each fiber optic connection assembly 164 further includes a fiber optic connector 168 for connecting that fiber optic connection assembly 164 to a respective fiber optic connection assembly 162 of the backplane 154.

Each fiber optic connection assembly 162 is similar to the connection assembly 22 of FIG. 1 in that the fiber optic connection assembly 162 includes alignment members 170. Additionally, each fiber optic connection assembly 164 is similar to the connection assembly 24 of FIG. 1 in that the fiber optic connection assembly 164 has grooves 172 which correspond to the alignment members 170. Further details of the connection assembly 164 is shown in FIG. 7.

Figure 7:
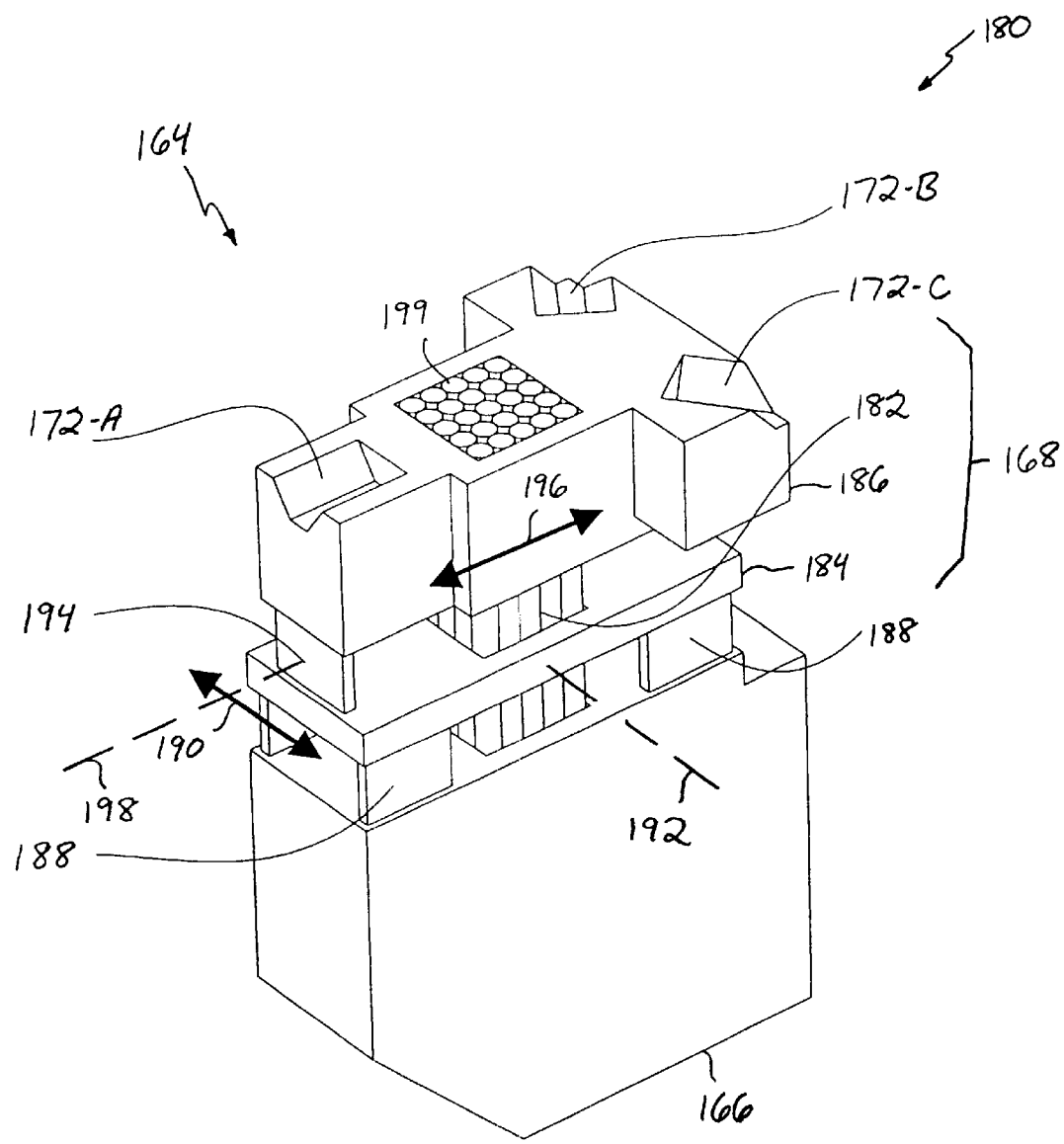
FIG. 7 is a detailed perspective view of a connection assembly of the circuit board connection system of FIG. 6.

FIG. 7 shows a perspective view 180 of a fiber optic connection assembly 164 of the circuit board 156. The connection assembly 164 includes a base portion which mounts to the circuit board 156, namely the transducer 166, and a portion of fiber optic cable 182. The connection assembly 164 further includes an intermediate portion 184 that is movable relative to the transducer 166, and an end portion 186 that is movable relative to the intermediate portion 184. The transducer 166 surrounds a segment of the fiber optic cable portion 182, the intermediate portion 184 surrounds another segment of the fiber optic cable portion 182, and the end portion 186 rigidly attaches to the end of the fiber optic cable portion 182.

As shown in FIG. 7, the intermediate portion 184 includes a set of beams 188 which (i) permits the intermediate portion 184 to move transversely in a direction 190 (e.g., the Y-direction) relative to the transducer 166, and (ii) prevents the intermediate portion 184 from substantially pivoting around a first pivot axis 192 relative to the transducer. Similarly, the end portion 186 includes a set of beams 194 that (i) permits the end portion 186 to move transversely in a direction 196 (e.g., the X-direction) relative to the intermediate portion 184, and (ii) prevents the end portion 186 from substantially pivoting around a second pivot axis 198 relative to the intermediate portion 184.

The card cage 152, the backplane 154 and the circuit board 154 operate together to form a coupling assembly (see FIG. 6) that couples the connection assemblies 162 with the connection assemblies 164. When such coupling takes place, the alignment members 170 of the connection assemblies 162 engage the grooves 172 of the connection assemblies 164 to properly position the end portions 186 of each connection assembly 164 (see FIG. 7) with the alignment members 170 of the connection assemblies 162. In particular, the intermediate and end portions 184, 186 of a connection assembly 164 move transversely to precisely position the ends 199 of the fiber optic cable portion 182 with corresponding ends of a fiber optic cable portion of a corresponding connection assembly 162 (e.g., placing them in physical contact with each other and preventing air gaps) to minimize light energy loss across connection assemblies. As with the alignment member/groove pairs 40, 52 of the connection system 20 of FIG. 1, each alignment member/groove pair 170, 172 of the connection system 150 of FIG. 6 restricts movement along a particular direction (i.e., perpendicular to the central axis of the groove 172) but permits movement in another direction (i.e., along the central axis of the groove 172). Accordingly, stress and distortion on the connector bodies that would otherwise form air gaps and cause misalignment of the ends of the fiber optic cables is minimized. Further details of how the connection assemblies 162 fit relative to each other will now be provided with reference to FIG. 8.

Figure 8:
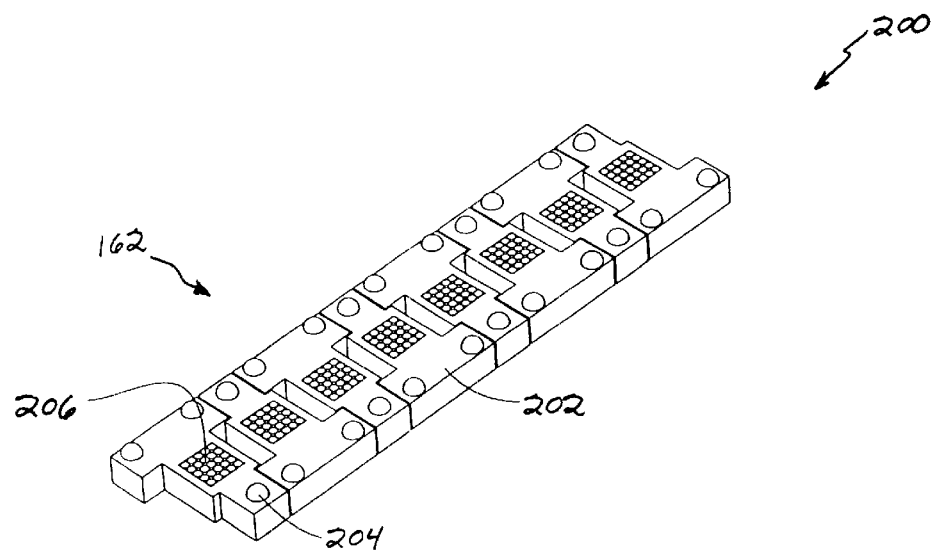
FIG. 8 is a perspective view of a row of connection assemblies which is suitable for use by the circuit board connection system of FIG. 6.

FIG. 8 shows an arrangement 200 of connection assemblies 162 which is suitable for use on the backplane 154. As shown, each connection assembly 162 includes a housing 202 that defines an alignment member 204 and an array of fiber ends 206 which are fastened to the housing 202. The connection assemblies 162 are dimensioned to enable them to be stacked in a reversing manner side-by-side in a high-density configuration. It should be understood that alternative arrangements for the connection assemblies 162 are suitable for use as well (e.g., end-to-end arrangements, diagonal arrangements, arrangements where the connection assemblies 162 are completely separated by space, etc.).

Figure 9:
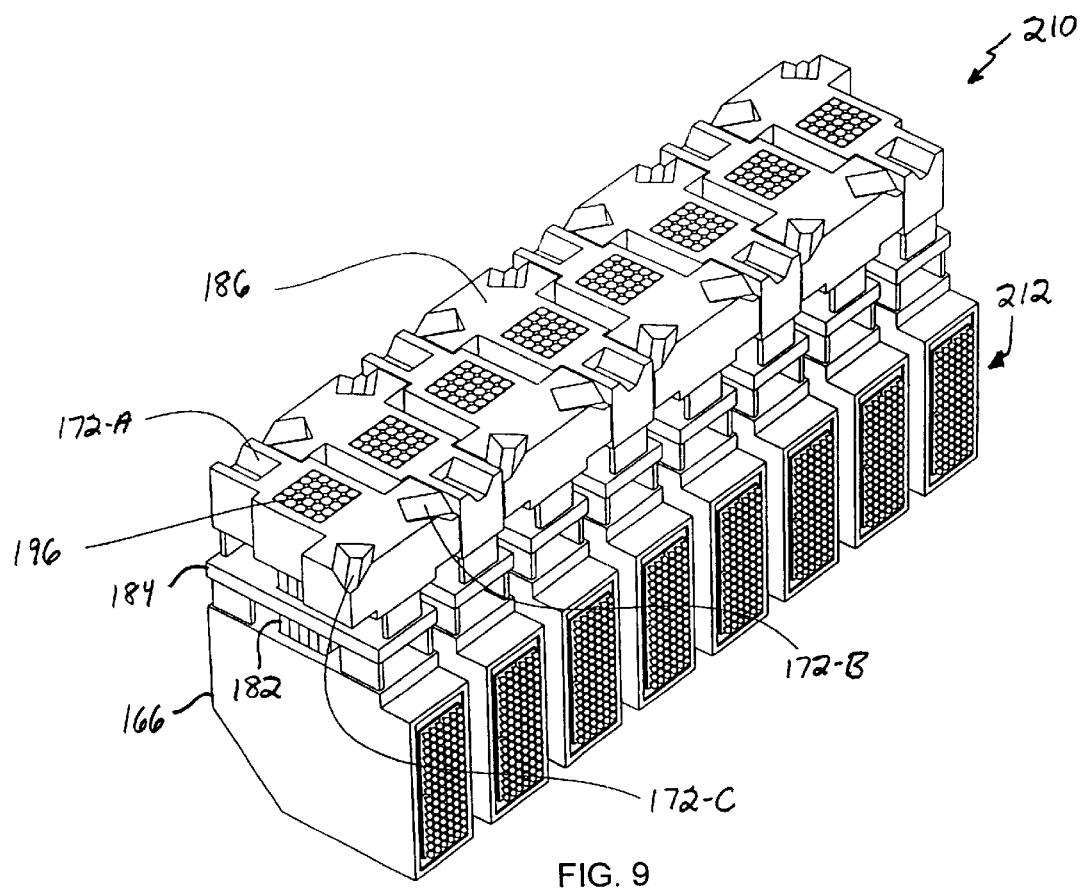
FIG. 9 is a perspective view of a row of ball-grid array transducers which is suitable for use by the circuit board connection system of FIG. 6.

FIG. 9 shows an arrangement 210 of connection assemblies 164 which is suitable for use on the circuit board 156. As with the connection assemblies 162 in the arrangement 200 of FIG. 8, the end portions 186 are dimensioned to enable them to be stacked in a reversing manner side-by-side in a high-density configuration as well. Accordingly, the connection assemblies 164 engage the connection assemblies 162 in a uniform, consistent and repeatable manner. As with the connection assemblies 162, it should be understood that alternative arrangements for the connection assemblies 164 are suitable for use as well (e.g., end-to-end arrangements, diagonal arrangements, arrangements where the connection assemblies 164 are completely separated by space, etc.). By way of example only, the transducers 166 include ball grid array (BGA) mounting features 212 for mounting to the circuit board 156. Other mounting and soldering technologies are suitable for use as well (e.g., lead frame).

As described above, the invention is directed to techniques for forming a fiber optic connection between a first connection assembly that provides alignment members and a second connection assembly that provides grooves such that a central axis of each groove of the second connection assembly is substantially perpendicular with a central axis of a corresponding alignment member of the first connection assembly. Each alignment member/groove pair can be positioned and oriented to control positioning of the first and second connection assemblies relative to each other in a single direction but allow movement in other directions to prevent physical stressing of the connection assemblies. For example, the alignment members of the first connection assembly can be arranged around a periphery of a first array of fiber ends of a first fiber optic cable, and the grooves of the second connection assembly can be arranged around a periphery of a second array of fiber ends of a second fiber optic cable such that the aggregate contribution of each alignment member/groove pair forms a self-aligning mechanism that properly aligns the first and second arrays of fiber ends to provide effective light transfer between fiber optic cables. Stresses that would otherwise form air gaps and cause misalignment of the fiber optic cable ends if the alignment members were not free to move in other directions (e.g., along the central axes of the grooves) are thus avoided. The features of the invention, as described above, may be employed in computer systems, connection systems, computer-related devices and components, and methods, as well as other fiber optic-related components such as those manufactured by Teradyne, Inc. of Boston, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the fiber optic cable portions 28, 48 of the connection system 20 of FIG. 1 were illustrated as being longer than the depth of the connector housings and belonging to cables by way of example only. In other arrangements, such as the connection system 150 of FIG. 6, the fiber optic cable portions are short. In particular, the fiber optic cable portions for the connection assemblies 162 can be as short as the connector housings themselves.

Additionally, it should be understood that the connection assemblies 164 for the circuit board 156 were described as having beamed portions 184, 186 by way of example only. In other arrangements, the circuit board 156 has spring-separated base and floating portions similar to the spring-separated base portion 34 and floating portion 36 of the connection assembly of FIG. 1.

Furthermore, it should be understood that the surfaces 72 of the grooves 52 were described as being flat by way of example only. In other arrangements, the surfaces 72 are not flat, e.g., curved surfaces that are arch-shaped, etc.

Additionally, it should be understood that the arrays of fiber ends 42, 58, 199, 206 were shown as ferruled 5×5 matrixes by way of example only. In other arrangements, the number of fiber ends in the arrays is different (e.g., 1, 2×2, 4×5, etc.). A benefit of keeping the shape of the array fairly square rather than as an elongated rectangle (e.g., 2×12) is that the fiber ends furthest from the stiffness focal point (e.g., see the intersection point 142 of FIG. 5) are still relatively close to that point thus minimizing the effect of any error. In such arrangements, the fiber ends of the array are fairly perpendicular (rather than substantially tapered) even after polishing since the fiber ends which are furthest from the center of the array are still relatively close to the center of the array. Accordingly, light energy loss due to air gaps (i.e., lack of physical contact between corresponding fiber ends) and improperly angled fiber ends is minimized.

Furthermore, it should be understood that the connection assemblies 22, 24 were described above as including a ferrule (e.g., see the precision ferrule 51 of FIG. 1) that was separate from the connector housings 33, 50. In other arrangements, the ferrule is integrated with the connector housings. For example, with reference to FIG. 1, the ferrule which holds the array of fiber ends 58 include the components labeled 50 and 51, i.e., a single integrated component.

Additionally, it should be understood that the transducer 166 was described above as operating as an active transceiver (a transmitter and receiving device). In other arrangements, the transducer 166 is solely a transmitter. In other arrangements, the transducer 166 is solely a receiver.

Furthermore, it should be understood that the components of the fiber optic connection system 150 need not be active fiber optic components. In other arrangements, the backplane 154 and the circuit board 156 include passive fiber optic components (e.g., "pass through" fiber optic connectors) that provide passive optical interconnections. Such modifications and enhancements are intended to be within the scope of the invention.

What is claimed is:

1. A connection system, comprising:
    a first connection assembly having a first fiber optic cable portion and a first connector fastened to an end of the first fiber optic cable portion, the first connector having a housing and alignment members that extend from the housing;
    a second connection assembly having a second fiber optic cable portion and a second connector fastened to an end of the second fiber optic cable portion, the second connector having a housing that defines grooves; and
    a coupling assembly that couples the first connector of the first connection assembly with the second connector of the second connection assembly such that (i) the end of the first fiber optic cable portion faces the end of the second fiber optic cable portion, (ii) each alignment member of the first connector has a central axis which is substantially perpendicular to a central axis of a corresponding groove defined by the housing of the second connector, and (iii) each alignment member of the first connector has substantial freedom of movement along the central axis of the corresponding groove defined by the housing of the second connector.

2. A connection system, comprising:
    a first connection assembly having a first fiber optic cable portion and a first connector fastened to an end of the first fiber optic cable portion, the first connector having a housing and alignment members that extend from the housing;
    a second connection assembly having a second fiber optic cable portion and a second connector fastened to an end of the second fiber optic cable portion, the second connector having a housing that defines grooves; and
    a coupling assembly that couples the first connector of the first connection assembly with the second connector of the second connection assembly such that (i) the end of the first fiber optic cable portion faces the end of the second fiber optic cable portion and (ii) a central axis of each groove defined by the housing of the second connector is substantially perpendicular with a central axis of a corresponding alignment member of the first connector, wherein the central axes of the grooves intersect at an intersection point.

3. The connection system of claim 2 wherein the end of the second fiber optic cable portion includes an M×N array of fiber ends; wherein M and N are positive integers greater than or equal to 1; and wherein the intersection point resides within the M×N array of fiber ends.

4. The connection system of claim 1 wherein the housing of the second connector defines, for each groove, at least two planar surfaces such that the corresponding alignment member for that groove contacts the housing at two locations when the first connector of the first connection assembly couples with the second connector of the second connection assembly.

5. A connection system, comprising:
    a first connection assembly having a first fiber optic cable portion and a first connector fastened to an end of the first fiber optic cable portion, the first connector having a housing and alignment members that extend from the housing;
    a second connection assembly having a second fiber optic cable portion and a second connector fastened to an end of the second fiber optic cable portion, the second connector having a housing that defines grooves; and a coupling assembly that couples the first connector of the first connection assembly with the second connector of the second connection assembly such that (i) the end of the first fiber optic cable portion faces the end of the second fiber optic cable portion and (ii) a central axis of each groove defined by the housing of the second connector is substantially perpendicular with a central axis of a corresponding alignment member of the first connector, wherein the housing of the first connector includes a base portion and a floating portion that is movable relative to the base portion; and wherein the floating portion defines the alignment members.

6. The connection system of claim 5 wherein the first connection assembly further includes springs disposed between the base portion and the floating portion of the first connector; and wherein the floating portion is rigidly attached to the end of the first fiber optic cable portion such that the end of the first fiber optic cable portion is movable relative to the base portion.

7. A connection system, comprising:

a first connection assembly having a first fiber optic cable portion and a first connector fastened to an end of the first fiber optic cable portion, the first connector having a housing and alignment members that extend from the housing;

a second connection assembly having a second fiber optic cable portion and a second connector fastened to an end of the second fiber optic cable portion, the second connector having a housing that defines grooves; and a coupling assembly that couples the first connector of the first connection assembly with the second connector of the second connection assembly such that (i) the end of the first fiber optic cable portion faces the end of the second fiber optic cable portion and (ii) a central axis of each groove defined by the housing of the second connector is substantially perpendicular with a central axis of a corresponding alignment member of the first connector, wherein the housing of the first connector includes:

a base portion that surrounds a first segment of the first fiber optic cable portion;

an intermediate portion that surrounds a second segment of the first fiber optic cable portion, the intermediate portion including a set of beams that (i) permits the intermediate portion to move transversely relative to the base portion, and (ii) prevents the intermediate portion from substantially pivoting around a first pivot axis relative to the base portion; and an end portion that rigidly attaches to the end of the first fiber optic cable portion, the end portion including a set of beams that (i) permits the end portion to move transversely relative to the intermediate portion, and (ii) prevents the end portion from substantially pivoting around a second pivot axis relative to the intermediate portion.

8. The connection system of claim 7 wherein the first pivot axis extends in a first direction, and wherein the second pivot axis extends in a second direction that is substantially perpendicular to the first direction.

9. A connection assembly for coupling to a receiving assembly, the connection assembly comprising:

a fiber optic cable portion; and a connector fastened to an end of the fiber optic cable portion, the connector having a housing and alignment members that extend from the housing such that, when the connection assembly couples with the receiving assembly, (i) the end of the fiber optic cable portion faces an end of a fiber optic cable portion of the receiving assembly, (ii) each alignment member of the connector has a central axis which is substantially perpendicular to a central axis of a corresponding groove defined by a housing of the receiving assembly, and (iii) each alignment member of the connector has substantial freedom of movement along the central axis of the corresponding groove defined by the housing of the receiving assembly.

10. The connection assembly of claim 9 wherein each alignment member has a rounded shape for contacting the housing of the receiving assembly at two locations of a corresponding groove defined by the housing of the receiving assembly.

11. A connection assembly for coupling to a receiving assembly, the connection assembly comprising:

a fiber optic cable portion; and a connector fastened to an end of the fiber optic cable portion, the connector having a housing and alignment members that extend from the housing such that, when the connection assembly couples with the receiving assembly, (i) the end of the fiber optic cable portion faces an end of a fiber optic cable portion of the receiving assembly and (ii) a central axis of each alignment member is substantially perpendicular to a central axis of a corresponding groove defined by a housing of the receiving assembly, wherein the housing of the connector of the connection assembly includes a base portion and a floating portion that is movable relative to the base portion; and wherein the floating portion defines the alignment members.

12. The connection assembly of claim 11 wherein the connection assembly further includes springs disposed between the base portion and the floating portion; and wherein the floating portion is rigidly attached to the end of the fiber optic cable portion of the connection assembly such that the end of the fiber optic cable portion of the connection assembly is movable relative to the base portion.

13. A connection assembly for coupling to a receiving assembly, the connection assembly comprising:

a fiber optic cable portion; and a connector fastened to an end of the fiber optic cable portion, the connector having a housing and alignment members that extend from the housing such that, when the connection assembly couples with the receiving assembly, (i) the end of the fiber optic cable portion faces an end of a fiber optic cable portion of the receiving assembly and (ii) a central axis of each alignment member is substantially perpendicular to a central axis of a corresponding groove defined by a housing of the receiving assembly, wherein the housing of the connector of the connection assembly includes:

a base portion that surrounds a first segment of the fiber optic cable portion of the connection assembly;

an intermediate portion that surrounds a second segment of the first fiber optic cable portion of the connection assembly, the intermediate portion including a set of beams that (i) permits the intermediate portion to move transversely relative to the base portion, and (ii) prevents the intermediate portion from substantially pivoting around a first pivot axis relative to the base portion; and an end portion that rigidly attaches to the end of the first fiber optic cable portion of the connection assembly, the end portion including a set of beams that (i) permits the end portion to move transversely relative to the intermediate portion, and (ii) prevents the end portion from substantially pivoting around a second pivot axis relative to the intermediate portion.

14. The connection assembly of claim 13 wherein the first pivot axis extends in a first direction, and wherein the second pivot axis extends in a second direction that is substantially perpendicular to the first direction.

15. A connection assembly for coupling to a receiving assembly, the connection assembly comprising:

a fiber optic cable portion; and a connector fastened to an end of the fiber optic cable portion, the connector having a housing that defines grooves such that, when the connection assembly couples with the receiving assembly, (i) the end of the fiber optic cable portion faces an end of a fiber optic cable portion of the receiving assembly, (ii) each alignment member of the receiving assembly has a central axis which is substantially perpendicular to a central axis of a corresponding groove defined by the housing of the connector, and (iii) each alignment member of the receiving assembly has substantial freedom of movement along the central axis of the corresponding groove defined by the housing of the connector.

16. A connection assembly for coupling to a receiving assembly, the connection assembly comprising:

a fiber optic cable portion; and a connector fastened to an end of the fiber optic cable portion, the connector having a housing that defines grooves such that, when the connection assembly couples with the receiving assembly, (i) the end of the fiber optic cable portion faces an end of a fiber optic cable portion of the receiving assembly and (ii) a central axis of each groove defined by the housing of the connector is substantially perpendicular to a central axis of a corresponding alignment member of a connector of the receiving assembly wherein the central axes of the grooves intersect at an intersection point.

17. The connection assembly of claim 16 wherein the end of the fiber optic cable portion of the connection assembly includes an M×N array of fiber ends; wherein M and N are positive integers greater than or equal to 1; and wherein the intersection point resides within the M×N array of fiber ends.

18. The connection assembly of claim 15 wherein the housing of the connector of the connection assembly defines, for each groove, at least two planar surfaces such that the corresponding alignment member for that groove contacts that housing at two locations when the connector of the connection assembly couples with the connector of the receiving assembly.

19. A method for connecting a first connection assembly to a second connection assembly, comprising the steps of:

providing (i) a first connection assembly having a first fiber optic cable portion and a first connector fastened to an end of the first fiber optic cable portion, the first connector defining alignment members, and (ii) a second connection assembly having a second fiber optic cable portion and a second connector fastened to an end of the second fiber optic cable portion, the second connector defining grooves;

aligning the first connection assembly and the second connection assembly such that the end of the first fiber optic cable portion faces the end of the second fiber optic cable portion; and coupling the first connector of the first connection assembly with the second connector of the second connection assembly such that (i) the end of the first fiber optic cable portion continues to face the end of the second fiber optic cable portion, (ii) each alignment member defined by the first connector has a central axis which is substantially perpendicular with a central axis of a corresponding groove defined by the second connector, and (iii) each alignment member defined by the first connector has substantial freedom of movement along the central axis of the corresponding groove defined by the second connector.

20. A method for connecting a first connection assembly to a second connection assembly, comprising the steps of:

providing (i) a first connection assembly having a first fiber optic cable portion and a first connector fastened to an end of the first fiber optic cable portion, the first connector defining alignment members, and (ii) a second connection assembly having a second fiber optic cable portion and a second connector fastened to an end of the second fiber optic cable portion, the second connector defining grooves;

aligning the first connection assembly and the second connection assembly such that the end of the first fiber optic cable portion faces the end of the second fiber optic cable portion; and coupling the first connector of the first connection assembly with the second connector of the second connection assembly such that (i) the end of the first fiber optic cable portion continues to face the end of the second fiber optic cable portion and (ii) a central axis of each groove defined by the second connector is substantially perpendicular with a central axis of a corresponding alignment member defined by the first connector, wherein the connector of the first connection assembly includes a base portion and a floating portion that is movable relative to the base portion; wherein the floating portion defines the alignment members; wherein the first connection assembly further includes springs disposed between the base portion and the floating portion; and wherein the step of coupling includes the step of:

compressing the springs such that the springs provide a force on the floating portion of the connector of the first connection assembly that pushes the floating portion against the second connector of the second connection assembly.

21. A connection system, comprising:

a first connection assembly having a first fiber optic cable portion and a first connector fastened to an end of the first fiber optic cable portion, the first connector having a housing and alignment members that extend from the housing;

a second connection assembly having a second fiber optic cable portion and a second connector fastened to an end of the second fiber optic cable portion, the second connector having a housing that defines grooves such that, when the first connection assembly connects with the second connection assembly, (i) the end of the first fiber optic cable portion faces the end of the second fiber optic cable portion, (ii) each alignment member of the first connector has a central axis which is substantially perpendicular with a central axis of a corresponding one of the grooves defined by the housing of the second connector, and (iii) each alignment member of the first connector has substantial freedom of movement along the central axis of the corresponding one of the grooves defined by the housing of the second connector.

* * * * *